United States Patent
Slentz

(10) Patent No.: US 7,325,839 B2
(45) Date of Patent: Feb. 5, 2008

(54) CONDENSATE DRAIN HOSE FITTING FOR A FLOOR DRAIN

(76) Inventor: William A. Slentz, 12920 Broadmoor St., Shawnee Mission, KS (US) 66209-4016

( * ) Notice: Subject to any disclaimer, the term of this patent is extended or adjusted under 35 U.S.C. 154(b) by 176 days.

(21) Appl. No.: 11/190,444

(22) Filed: Jul. 27, 2005

(65) Prior Publication Data

US 2005/0236057 A1    Oct. 27, 2005

(51) Int. Cl.
*F16L 5/00* (2006.01)
(52) U.S. Cl. .......................... 285/191; 285/189; 285/8; 285/211
(58) Field of Classification Search ................ 285/190, 285/191, 189, 192, 71, 65, 68, 8, 123.3, 211
See application file for complete search history.

(56) References Cited

U.S. PATENT DOCUMENTS

| 476,012 | A | * | 5/1892 | Haworth | 285/191 |
| 597,259 | A | * | 1/1898 | Brady | 285/139.1 |
| 608,207 | A | * | 8/1898 | Merritt | 285/191 |
| 917,717 | A | * | 4/1909 | Deidrick | 285/191 |
| 964,954 | A | | 7/1910 | Coles | |
| 1,173,854 | A | * | 2/1916 | Pearch | 285/191 |
| 1,528,081 | A | * | 3/1925 | Schermerhorn et al. | 285/328 |
| 1,603,241 | A | * | 10/1926 | McLean | 285/191 |
| 1,760,704 | A | * | 5/1930 | Lindstrom | 285/191 |
| 2,177,566 | A | * | 10/1939 | Horwitz | 285/191 |
| 2,274,453 | A | * | 2/1942 | Matter | 285/8 |
| 3,202,123 | A | * | 8/1965 | Goodfriend | 285/9.2 |
| 3,700,381 | A | | 10/1972 | Deeke | |
| 4,109,939 | A | | 8/1978 | Roberts | |
| 4,181,330 | A | | 1/1980 | Kojima | |
| 4,722,556 | A | | 2/1988 | Todd | |
| 4,758,027 | A | | 7/1988 | Todd | |
| 5,244,003 | A | | 9/1993 | Boomgaarden | |
| 5,755,527 | A | | 5/1998 | Dufresne | |
| 5,934,331 | A | | 8/1999 | Earl | |

* cited by examiner

*Primary Examiner*—David Bochna
(74) *Attorney, Agent, or Firm*—Kenneth W. Iles

(57) ABSTRACT

A drain fitting includes a cylindrical body that is sealed against a floor drain cover to confine condensate liquid, such as from an air conditioner, inside the perimeter of the drain fitting by tightening a self-tapping screw that is inserted into a hollow stem in the center of the central body portion of the drain fitting, pulling a gasket in the bottom surface of the drain fitting against a floor drain cover. A nipple connected to the drain fitting receives a condensate drain hose. A vent opening is formed into a side wall of drain fitting.

10 Claims, 3 Drawing Sheets

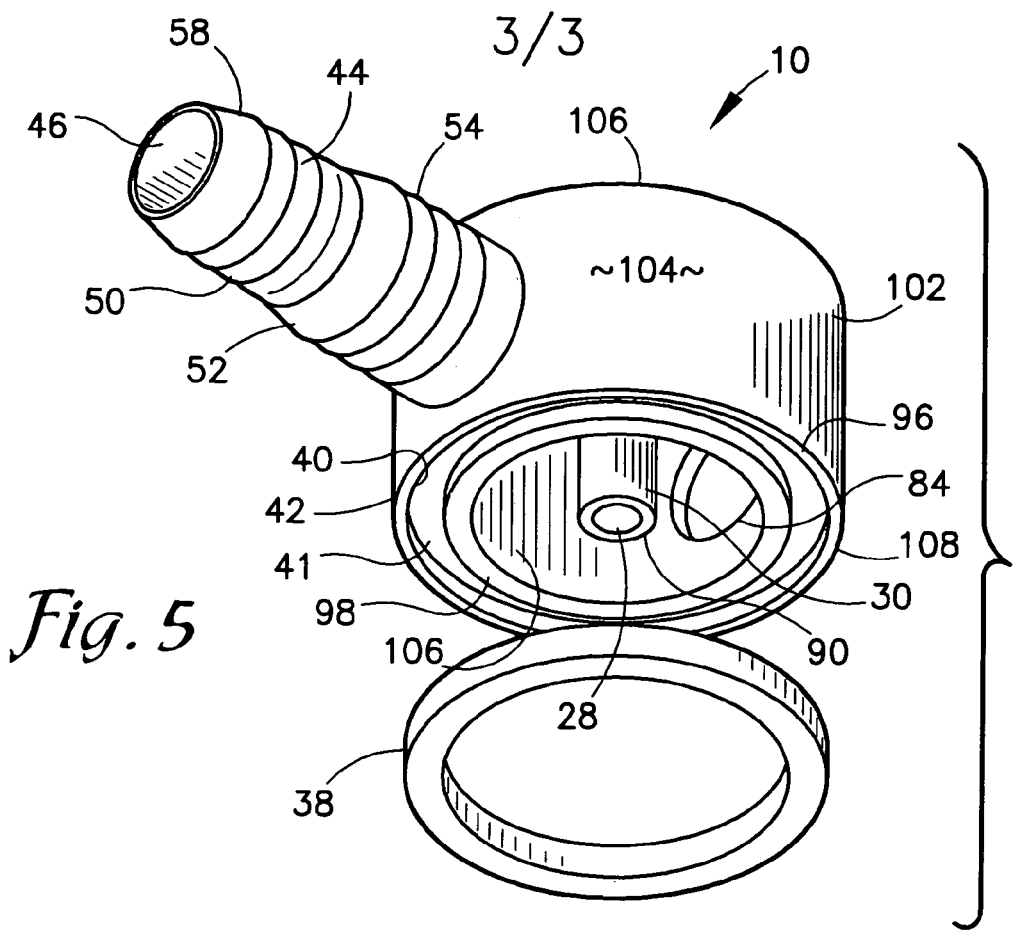
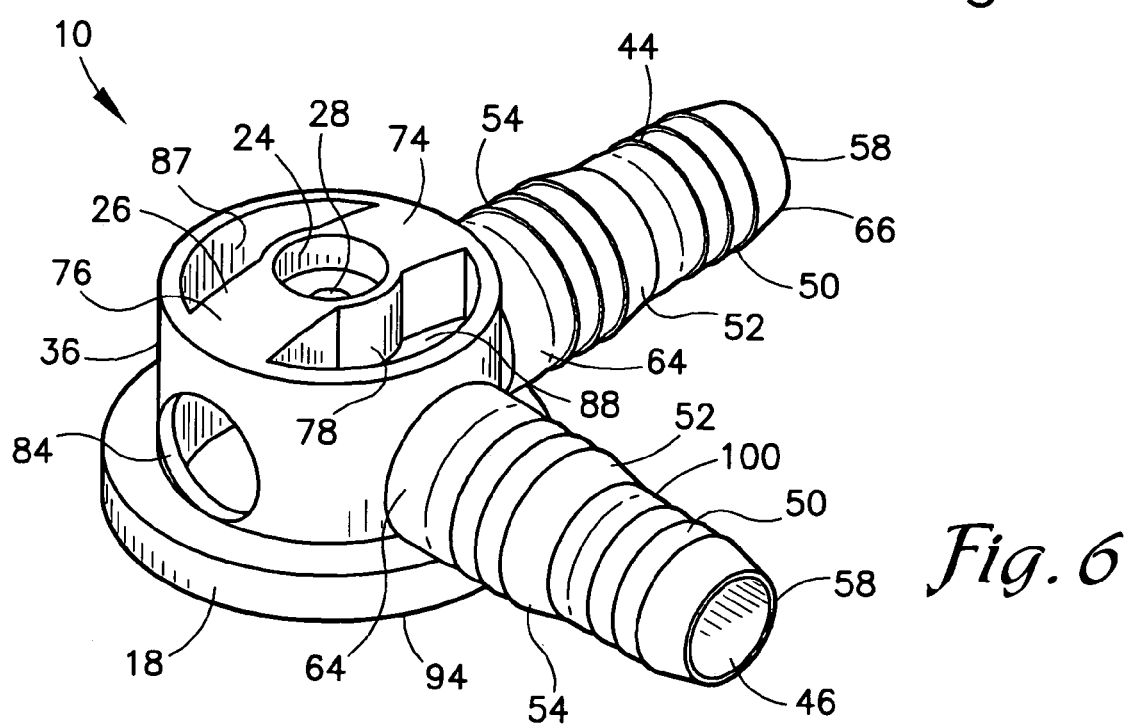

CONDENSATE DRAIN HOSE FITTING FOR A FLOOR DRAIN

CROSS-REFERENCE TO RELATED APPLICATIONS

Not Applicable.

STATEMENT REGARDING FEDERALLY SPONSORED RESEARCH OR DEVELOPMENT

Not applicable.

SEQUENCE LISTING

Not applicable.

BACKGROUND OF THE INVENTION

The present invention is related to a device for holding a condensate drain hose fitting for a floor drain, such as from an air conditioner, dehumidifier, humidifier, high-efficiency condensing furnace or the like and covering the resulting condensate as it is directed into a floor drain.

DESCRIPTION OF THE RELATED ART INCLUDING INFORMATION DISCLOSED UNDER 37 C.F.R. 1.97 and 1.98.

Various small diameter hoses, such as condensate drain hoses from air conditioners, dehumidifies and the like are typically run toward a floor drain in a basement. Often such hoses simply lie on the floor in the general vicinity of the floor drain. Sometimes a cable tie, restraining collar or the like is wrapped around the end of the drain hose on the floor and the cable tie, restraining collar of the like is fastened to the floor drain by a screw or the like. In either case, the condensate runs along the drain cover and, usually, the floor. The condensate always included entrained debris, such as rust and sludge, which stains the floor and the drain cover, leading to an unsightly appearance. This contaminated condensate, along with the entrained sludge, frequently sits on the floor or drain cover for extended periods. In the summer, this area may be continuously wet, providing a breading place for bacteria, mold and fungus. Further, pets may be tempted to drink the condensate, which may be unhealthy. Pests, such as insects and rodents also drink from the water around floor drains.

Therefore, it would be useful to provide a means for connecting condensate drain hoses to a drain without leaving any unsightly stains or normally wet areas.

A search of the patent literature revealed no devices designed to meet these needs. Some more or less related devices have been patented, some of which are discussed below.

U.S. Pat. No. 5,934,331, issued to, Earl on Aug. 10, 1999, discloses a Floor Drain Adapter comprising with a 90° elbow having one end fastened to a floor drain by a number of small angle irons and a horizontally oriented upper opening sealed by a collar, which seals a diaphragm across the diameter of the elbow opening, with several hoses being pushed into the elbow up to the bend in the elbow. This adapter requires used of angle irons to connect it to the drain and basically covers the entire drain surface.

U.S. Pat. No. 4,758,027, issued to Todd on Jul. 19, 1988, discloses a Recreational Vehicle Sewerline Adapter comprising a flexible hose extending from a fluid source, such as a recreational vehicle's sewage system, having a downwardly oriented 90° elbow at its distal end, which includes a coupling fitting for insertion into a specific type of ground drain. The elbow can fit only into a specifically designed mating drain and the two pieces appear to be useful only in connection with each other.

U.S. Pat. No. 4,722,556, issued to Todd on Feb. 2, 1988, discloses a Recreational Vehicle Sewerline Adapter comprising a 90° elbow fitting having an upper portion horizontally disposed, with a threaded end portion for receiving a threaded drain hose. A vertically disposed lower end portion includes a flexible sealing element having a plurality of stepped-up larger diameters, so that the lower end may be sealed into drain openings of a number of different sizes. This fitting entirely covers and seals the drain, preventing its use for any other purpose while the adapter is in place.

U.S. Pat. No. 964,954, issued to Coles on Jul. 19, 1910, discloses a Drain Pipe Flushing Attachment comprising a disk body having a depending peripheral flange provided with an external screw thread in the centrally disposed upstanding nipple, which is closed by a threaded closure cap. The disk body is inserted into and sealed into the drain opening of a sink and a pressure hose is fixed to the nipple. Pressurized water is pumped through the hose and drain cover to flush the sink drain. When installed for use, the device completely covers the drain opening and when water is forced into the hose, the entire system is closed and sealed so that it can be pressurized. This cover covers the entire drain, preventing it from being used for any other purpose.

Again, none of the references disclose or suggest a device or apparatus that accomplishes, or could accomplish, the purpose of the condensate drain hose fitting for a floor drain disclosed herein. Nor do any of the reference disclose or suggest any structure similar to or suggestive of the structure of the condensate drain hose fitting for a floor drain disclosed herein.

Therefore, a need exists for a condensate drain hose fitting for a floor drain that provides a neat appearance for condensate drain hoses disposed in the vicinity of a drain cover; that prevents staining of the floor; that prevents standing water on the floor from the condensate drain hose; that can be used with standard condensate hose sizes without hose clamps or other fasteners; that seals against the floor drain to contain the condensed water and entrained sludge in the condensate; and that leaves the floor drain available for receiving other liquids.

BRIEF SUMMARY OF THE INVENTION

Accordingly, it is a primary object of the present invention to provide a condensate drain hose fitting for a floor drain that provides a neat appearance for condensate drain hoses disposed in the vicinity of a drain cover.

It is an other object of the present invention to provide a condensate drain hose fitting for a floor drain that prevents staining of the floor.

It is an other object of the present invention to provide a condensate drain hose fitting for a floor drain that prevents standing water on the floor from the condensate drain hose.

It is an other object of the present invention to provide a condensate drain hose fitting for a floor drain that can be used with standard condensate hose sizes without hose clamps or other fasteners.

It is an other object of the present invention to provide a condensate drain hose fitting for a floor drain that seals against the floor drain to contain the condensed water and entrained sludge in the condensate.

It is an other object of the present invention to provide a condensate drain hose fitting for a floor drain that leaves the floor drain available for receiving other liquids.

These objectives are achieved by providing a condensate drain hose fitting for a floor drain having a substantially cylindrical body having a planar lower surface for seating on a floor drain, with a vent opening to the outside air in a side wall of the cylindrical body and at least one hose receiving nipple protruding from the cylindrical body. A brace member crosses the top of the cylindrical body along a diameter of the cylindrical body and includes a countersink into a stem that projects vertically downward to the lower edge of the cylindrical body. A bore through the stem receives a set-tapping screw that taps into the floor drain. In the bottom surface of the cylindrical body lies a channel groove for receiving a gasket, preferably an O-ring, to seal the lower surface of the cylindrical body against the floor drain when the self-tapping screw is tightened.

In an alternative embodiment, more than one nipple protrudes from the cylindrical body, allowing a single unit to be receive more than one hose.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

BRIEF DESCRIPTION OF THE SEVERAL VIEWS OF THE DRAWING

FIG. 5 is a bottom isometric view of an alternative embodiment of the condensate drain hose fitting for a floor drain of FIG. 1.

FIG. 6 is a rear isometric view of an alternative embodiment of the condensate drain hose fitting for a floor drain of FIG. 1 having two condensate hose nipples.

DETAILED DESCRIPTION OF THE INVENTION

Figure 1:
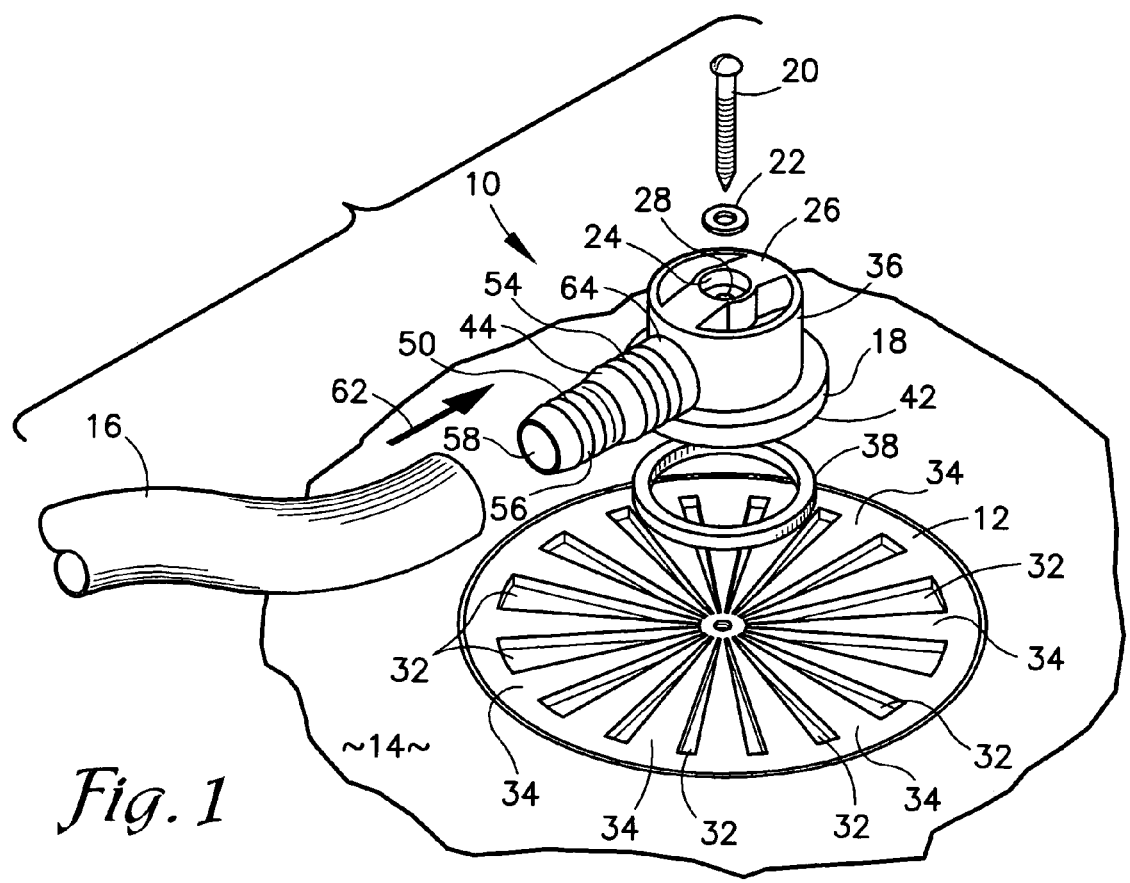
FIG. 1 is an exploded isometric view of a condensate drain hose fitting for a floor drain according to the present invention shown being prepared for installation in a floor drain cover.

Referring to FIG. 1, the condensate drain hose fitting for a floor drain (drain fitting) 10 adapted to be pressed against and sealed to the floor drain cover 12 that is seated into the floor 14 so that condensate flowing through the hose 16 is confined within the flange base 18 of the condensate drain fitting 10, while most of the surface area of the floor drain 12 remains uncovered and is available to receive and drain other liquids that may flow across the floor 14. The condensate drain fitting 10 is held in place by the self-tapping stainless steel screw 20, which is threaded through the washer 22 and is seated in the countersink 24 in the cross brace 26 and passes downward through the bore 28, which has a smooth interior side wall of uniform diameter, in the depending stem 30 (FIG. 4) and is then screwed into the floor drain cover 12. Such drain covers are typically made from either plastic or iron, with a plurality of drain openings 32 separated by a plurality of solid portions 34 and the screw 20 will self-tap into a solid portion 34 of either of these materials readily. The drain openings 32 and solid portions 34 can be formed in any desired pattern, such as the drain slots shown in FIG. 1, circular holes in the drain cover 12 or the like.

Still referring to FIG. 1, the condensate drain fitting 10 includes a sealing gasket 38, such as a rubber flat cut washer, rubber or neoprene O-ring or the like seated in an annular groove 40 (FIG. 4) in the bottom surface 42 (FIG. 4) of the flange base 18 of the drain fitting 10. The sealing gasket 34 seals the bottom surface 38 of the drain fitting 10 against the drain cover 12, preventing condensate from escaping from the area defined by the sealing gasket 38 and insuring that condensate runs down into the floor drain when the self-tapping screw 20 is tightened into the floor drain cover 12. The flange base 18 is wider, that is, has a larger diameter than the central (cylindrical) body portion 36 in order to provide space for the annular groove or channel 40 for retaining the O-ring gasket 38, which could as well be installed in a groove in the central body portion 36 as shown in FIG. 6, but this would require thicker side walls and hence more material.

Still referring to FIG. 1, a condensate hose nipple 44 projects outwardly from the central body portion 36, which is cylindrical but can be any desired shape having an internal cavity for receiving and draining condensate conveyed into it through the condensate hose 16. The condensate hose nipple 44 is horizontal when the central body portion 36 is vertically oriented. The hose nipple 44 includes a central bore, or channel 46, which has a smooth interior side wall, for conducting fluids into the drain cavity 48 (see, FIGS. 3, 4). The channel 46 is in fluid communication with the interior drain cavity 48 of the central body portion 36. The condensate hose nipple 44 further includes a smaller diameter distal end portion 50, a conical step up to a larger diameter portion 52 and a larger diameter portion 54. Each of these three portions is essentially conical, with its larger diameter end closer to the central body portion 36. The small diameter portion 50 includes a plurality of annual friction ridges 56, each of which pass about the entire circumference of the small diameter portion where each lies and that become, naturally, progressively larger from the distal end 58 of the hose nipple 44 toward the conical step up in diameter portion. The larger diameter portion 52 includes a plurality of similarly arrayed friction ridges 60. The smaller diameter portion 50 accepts and seals flexible hoses 16 of 1.6 cm (⅝ inches) in inside diameter, while the large diameter portion 52 accepts and seals hoses up to 1.9 cm (¾ inches) in inside diameter, which are the two sizes of hoses most commonly used for condensate drain hoses 16. Other sizes of drain hoses can easily be employed. The central bore 46 in the condensate hose nipple 44 communicates with the drain cavity 48 of the central body portion 36 of the drain fitting 10. The condensate hose 16 is fastened onto the condensate hose nipple 44 by pushing it onto the condensate hose nipple 44 by pushing in along the direction indicated by the arrow 62 until it has progressed toward the proximal end 64 of the condensate hose nipple 44 sufficiently to seal and is removed by pulling in the opposite direction. The condensate drain hose 16 need not be tightly sealed because little if any fluid pressure is exerted onto this coupling.

Figure 2:
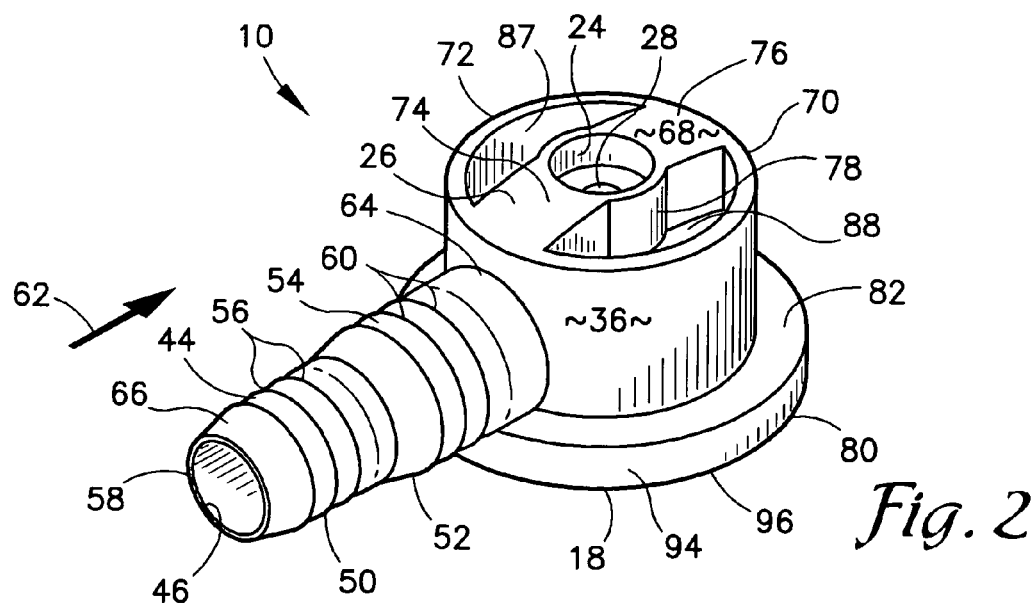
FIG. 2 is a front left-hand isometric view of the condensate drain hose fitting for a floor drain of FIG. 1.

Referring to FIG. 2, adjacent to the distal end 58 of the condensate hose nipple 44 is a conical beveled hose centering receiving tip 66 designed to receive and center a drain hose 16 readily and to facilitate sealing of the drain hose 16 onto the condensate hose nipple 44.

Still referring to FIG. 2, the cross brace 26 includes an upper surface 68 that is arched upward above the top edge 70 of the side wall 72 of the central body portion 36. A front portion 74 and a rear portion 76 of the cross brace are slightly wider at their outside edges where they join the side wall 72 that where each joins the countersink 24 at the cylindrical center portion 78 of the cross brace 26. The cross brace 26 has a thickness about one quarter of the height of the drain fitting 10, as measured from the lower edge 80 of the flange base 18 to the top edge 70. The flange base 18 has a larger diameter than the outside diameter of the central body portion 36, with the difference being accounted for by the horizontal annular flange step 82.

Figure 3:
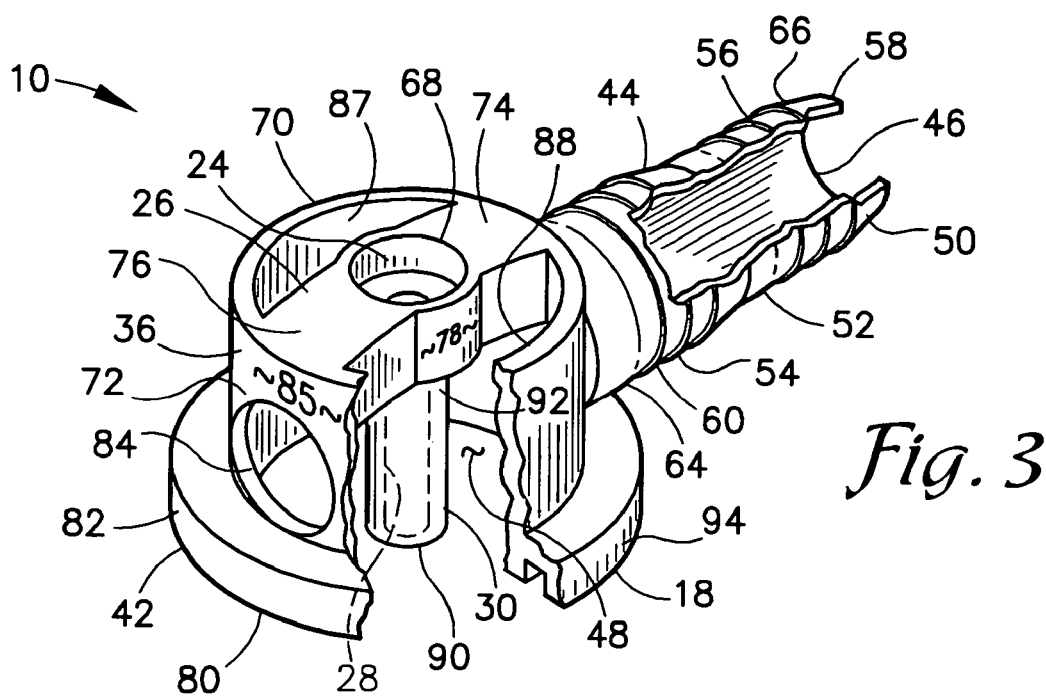
FIG. 3 is a rear isometric view of the condensate drain hose fitting for a floor drain of FIG. 1, with portions broken away to revel internal structures.

Referring to FIG. 3, a circular vent opening 84 is formed in the rear side wall 86 of the central body portion 36 and is adjacent to the annular flange step 82. The circular vent opening 84, which may be any desired shape, provides an overflow path adjacent to the drain cover 12 in the event that the drain holes become plugged and prevents any back pressure that could siphon any fluids backwards through the condensate drain hose 16. It could be expected that the openings 87, 88, which serve as a vacuum break, in the top of the central body portion 36 would accomplish this purpose, but these may become blocked by falling paper or other debris in a basement and building code inspectors feel more comfortable that the drain fitting 10 cannot cause any reverse siphoning when the circular vent opening 84, which would be less likely to be blocked, is included.

Still referring to FIG. 3, the depending stem includes a bottom edge 90 that lies in the same plan as the lower edge 80 of the flange base 18 and is tapered from its top end 92 to its lower end 80.

Figure 4:
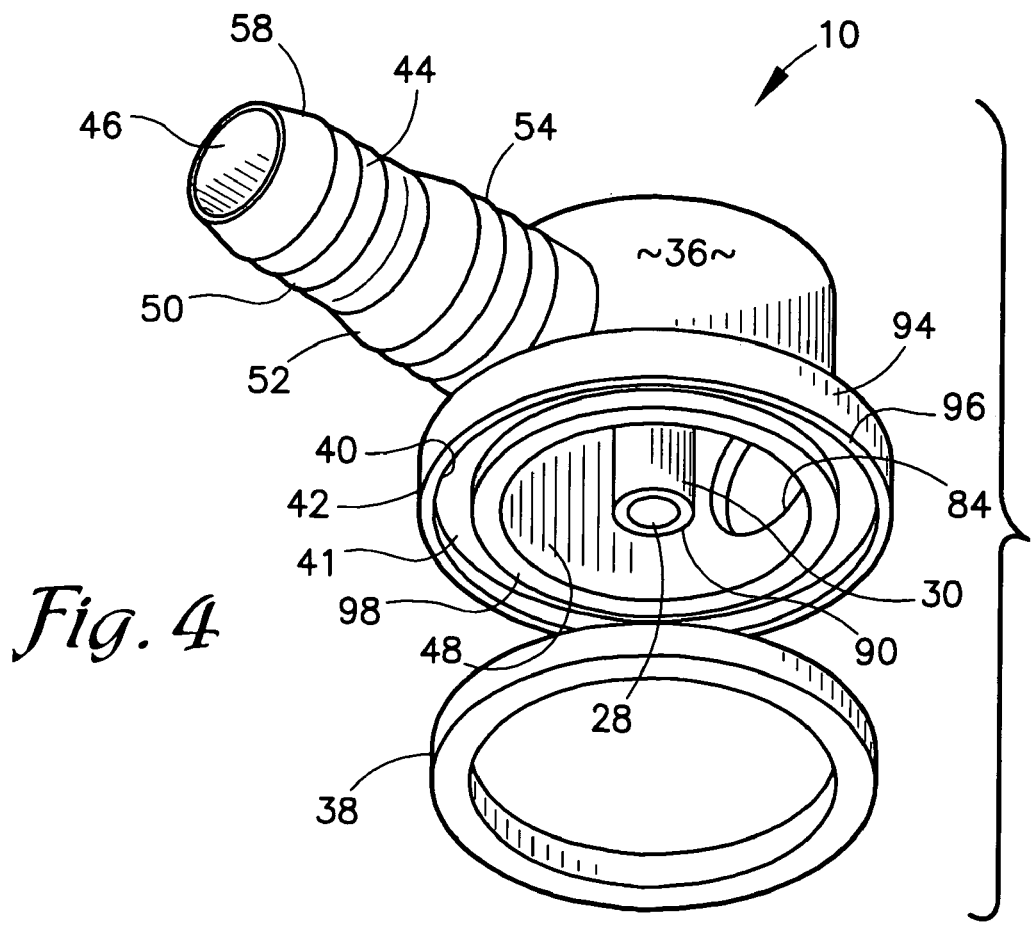
FIG. 4 is an exploded bottom isometric view of the condensate drain hose fitting for a floor drain of FIG. 1.

Referring to FIG. 4, the flange base 18 further includes a depending annular skirt portion or side wall 94 with an outer annular lip portion 96 and an inner annular lip portion 98, with the gasket receiving groove 40 between them for receiving the O-ring gasket 38. The groove 40 includes a flat upper surface 41, as viewed in FIG. 4, which could as well be a rounded upper groove surface to match and mate with the circular cross-section of the O-ring gasket 38. When seated in the groove 40, the O-ring gasket 38 has a lower surface slightly below the lower edge 80, allowing compression of the O-ring gasket 38 during tightening of the screw 20 to create a seal with the floor drain cover 12.

Referring to FIG. 5, the central body portion 102 of the drain fitting 10 includes an annular side wall 104 that is of uniform thickness from its top edge 106 to its bottom edge 108 and which defines an interior cavity 110 for receiving condensate or other fluid. The annular groove 40 includes a flat upper surface 108, but this may be rounded to conform with the profile of the O-ring gasket 38. The other features of the embodiment of FIG. 6 are the same as those shown in FIGS. 1-4 and described above.

Referring to FIG. 6, a second condensate hose nipple 100 is disposed at 90° to the condensate hose nipple 44 and is otherwise identical. The two condensate hose nipples 44, 100 lie in the same plane. Additional hose nipples can be disposed at any desired location about the central body portion 36 of the drain fitting 10.

The hose fitting 10 is preferably formed of a single piece by injection molding a suitable plastic material into a mold cavity.

I claim:
1. A device comprising
   a. a central body portion, said central body portion further comprising a cross brace in the top of the said device;
   b. a gasket seated in a groove in a bottom surface of said central body portion;
   c. means for conveying a fluid into a cavity in said central body potion; and
   d. means for continuously and automatically venting said central body portion to the air.
2. A device in accordance with claim 1 further comprising a depending stem fixed to said cross brace, said depending stem further comprising a bore through the length of said depending stem.
3. A device comprising;
   a. a central body portion;
   b. a gasket seated in groove in a bottom surface of said central body portion;
   c. means for conveying fluid into a cavity in said central body portion;
   d. means for continuously and automatically venting said central body portion to the air and
   e. means for fastening said central body portion to a drain wherein said fastening means further comprises a self-tapping screw inserted through an aperture in a cross brace across a top portion of said central body portion, whereby said gasket is brought into sealing contact with the floor drain.
4. A device comprising:
   a. a central body portion;
   b. a gasket seated in a groove in a bottom surface of said central body portion;
   c. means for conveying a fluid into a cavity in said central body portion said fluid conveying means further comprising at least one nipple connected to a side wall of said central body portion and having a channel in fluid communication with an interior cavity of said central body portion and
   d. means for continuously and automatically venting said central body portion to the air.
5. A device comprising:
   a. a central body portion, said central body portion further comprising a flange base connected to a lower edge of said central body portion, said gasket receiving groove being formed in a lower surface of said flange base and said gasket being seated in said gasket receiving groove
   b. a gasket seated in a groove in a bottom surface of said central body portion;
   c. means for conveying a fluid into a cavity in said central body portion; and
   d. means for continuously and automatically venting said central body portion to the air.
6. A device comprising:
   a. a central body portion;
   b. a flange base formed about a lower edge of said central body portion, a gasket receiving groove formed in a lower surface of said flange base and a gasket seated in said gasket receiving groove;
   c. means for conveying a fluid into a cavity in said central body portion; and
   d. a depending stem connected to a cross brace across a top of said central body portion, said depending stem having a bore through it.
7. A device in accordance with claim 6 further comprising a cylindrical flange base connected to a lower end of said central body portion, said central body portion being cylin- drical, and said cylindrical flange base having a larger diameter than said central body portion.

8. A device comprising:
a. a central body portion having a side wall defining a cylinder having an internal cavity;
b. a gasket seated in a groove in a bottom surface of said central body portion;
c. a cross brace connected to a top edge of said central body portion with a depending stem having a bore through it connected to said cross brace and depending into said cavity; and
c. at least one nipple connected to said central body portion and having an interior channel in fluid communication with an interior cavity of said central body portion.

9. A device in accordance with claim 8 further comprising a flat upper surface in said groove.

10. A device in accordance with claim 8 further comprising means for venting said central body portion to outside air.

* * * * *